(12) United States Patent
Ballantine et al.

(10) Patent No.: US 6,758,150 B2
(45) Date of Patent: Jul. 6, 2004

(54) SYSTEM AND METHOD FOR THERMALLY REDUCING SOLID AND LIQUID WASTE AND FOR RECOVERING WASTE HEAT

(75) Inventors: Mike Ballantine, Las Vegas, NV (US); Frank Reed, Paso Robles, CA (US); Edward Stammel, III, Henderson, NV (US)

(73) Assignee: Energy Associates International, LLC, Las Vegas, NV (US)

( * ) Notice: Subject to any disclaimer, the term of this patent is extended or adjusted under 35 U.S.C. 154(b) by 0 days.

(21) Appl. No.: 10/196,697

(22) Filed: Jul. 15, 2002

(65) Prior Publication Data

US 2003/0010266 A1 Jan. 16, 2003

Related U.S. Application Data

(60) Provisional application No. 60/305,919, filed on Jul. 16, 2001.

(51) Int. Cl.[7] .............................. F23K 3/14; F23G 5/00
(52) U.S. Cl. ...................... 110/229; 110/233; 110/255; 110/110
(58) Field of Search ................................ 110/115, 229, 110/230, 231, 253, 233, 255, 101 R, 110, 327, 342, 346, 214; 34/424; 423/31

(56) References Cited

U.S. PATENT DOCUMENTS

| | | | | |
|---|---|---|---|---|
| 4,084,521 A | * | 4/1978 | Herbold et al. | 110/242 |
| 4,210,491 A | * | 7/1980 | Schulman | 201/2.5 |
| 4,347,119 A | * | 8/1982 | Thomas | 208/11 R |
| 4,412,889 A | * | 11/1983 | Oeck | 202/117 |
| 4,474,121 A | * | 10/1984 | Lewis | 110/346 |
| 4,759,300 A | * | 7/1988 | Hansen et al. | 110/229 |
| 4,861,262 A | * | 8/1989 | Gitman et al. | 431/5 |
| 5,269,233 A | * | 12/1993 | Johnson et al. | 110/110 |
| 5,295,448 A | * | 3/1994 | Vickery | 110/214 |
| 5,296,005 A | * | 3/1994 | Wolfe et al. | 44/551 |
| 5,411,714 A | * | 5/1995 | Wu et al. | 422/232 |
| 5,653,183 A | * | 8/1997 | Hansen et al. | 110/346 |
| 5,720,232 A | * | 2/1998 | Meador | 110/346 |
| 5,846,072 A | * | 12/1998 | Willis | 432/31 |
| 6,202,577 B1 | * | 3/2001 | Boguslavsky et al. | 110/346 |
| 6,226,889 B1 | * | 5/2001 | Aulbaugh et al. | 34/424 |
| 6,261,090 B1 | * | 7/2001 | Boswell et al. | 432/72 |
| 6,412,428 B1 | * | 7/2002 | Promuto | 110/224 |

FOREIGN PATENT DOCUMENTS

EP          0717239     *  6/1996    ............. F23G/7/06

* cited by examiner

*Primary Examiner*—Kenneth B Rinehart
(74) *Attorney, Agent, or Firm*—Philip J. Anderson; Anderson & Morishta, LLC

(57) ABSTRACT

A system and method are set for pyrolysis of waste feed material including a first retort segment disposed through a combustion chamber and a second retort segment disposed outside of the combustion chamber. The combustion chamber supplies the heat for pyrolysis to the material conveyed through the first retort segment, which pyrolysis is completed as it is conveyed through the second retort segment. A thermal oxidizer oxidizes off gases and a stack unit provides a draft to move the gases from pyrolysis from the retort segments and through the thermal oxidizer.

5 Claims, 5 Drawing Sheets

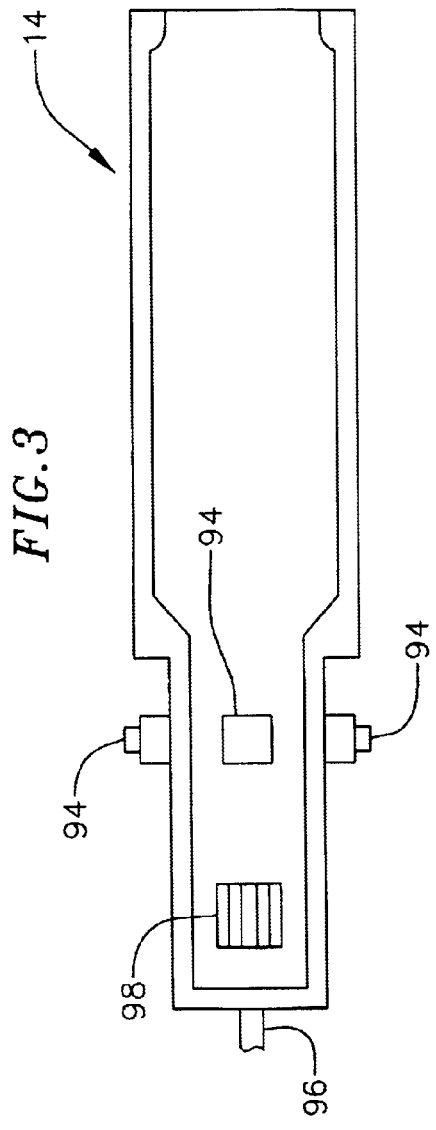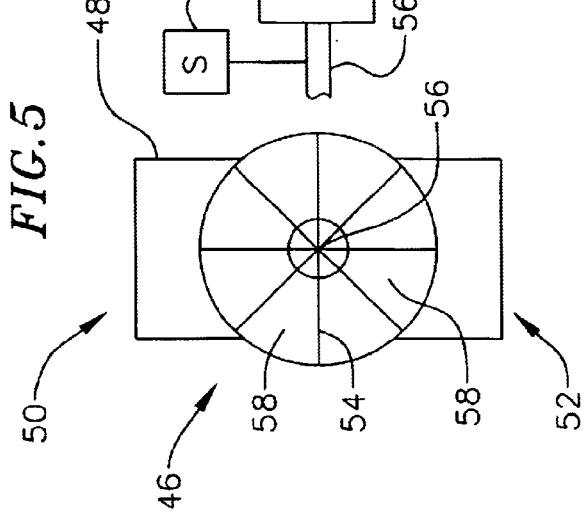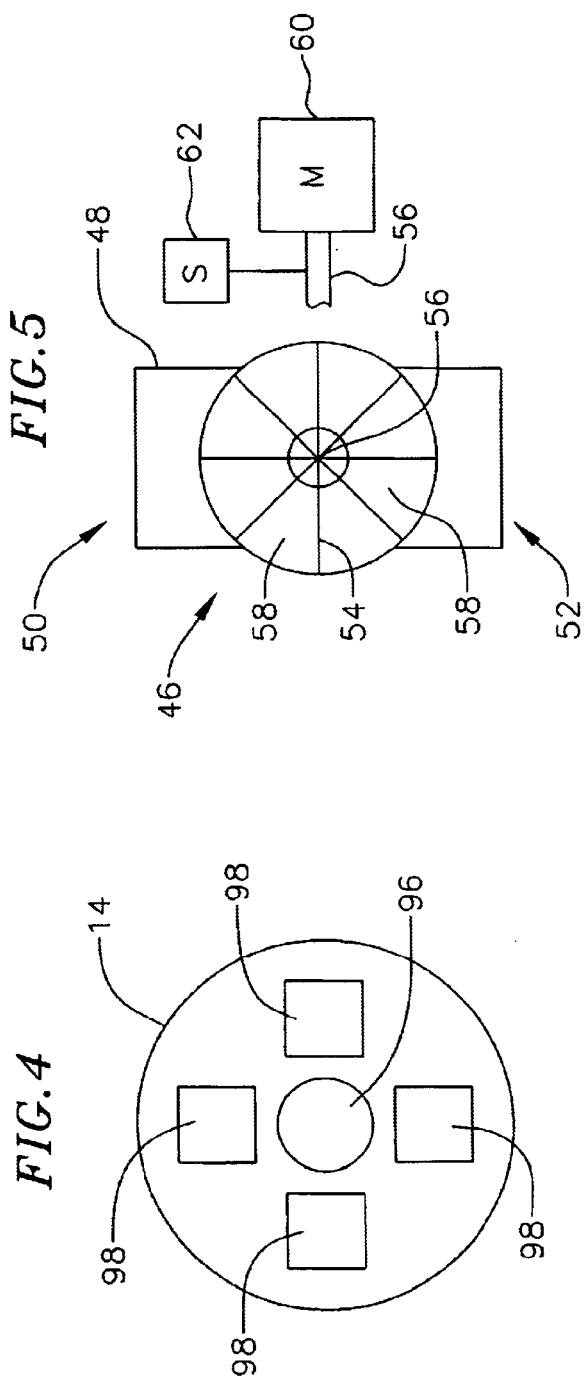

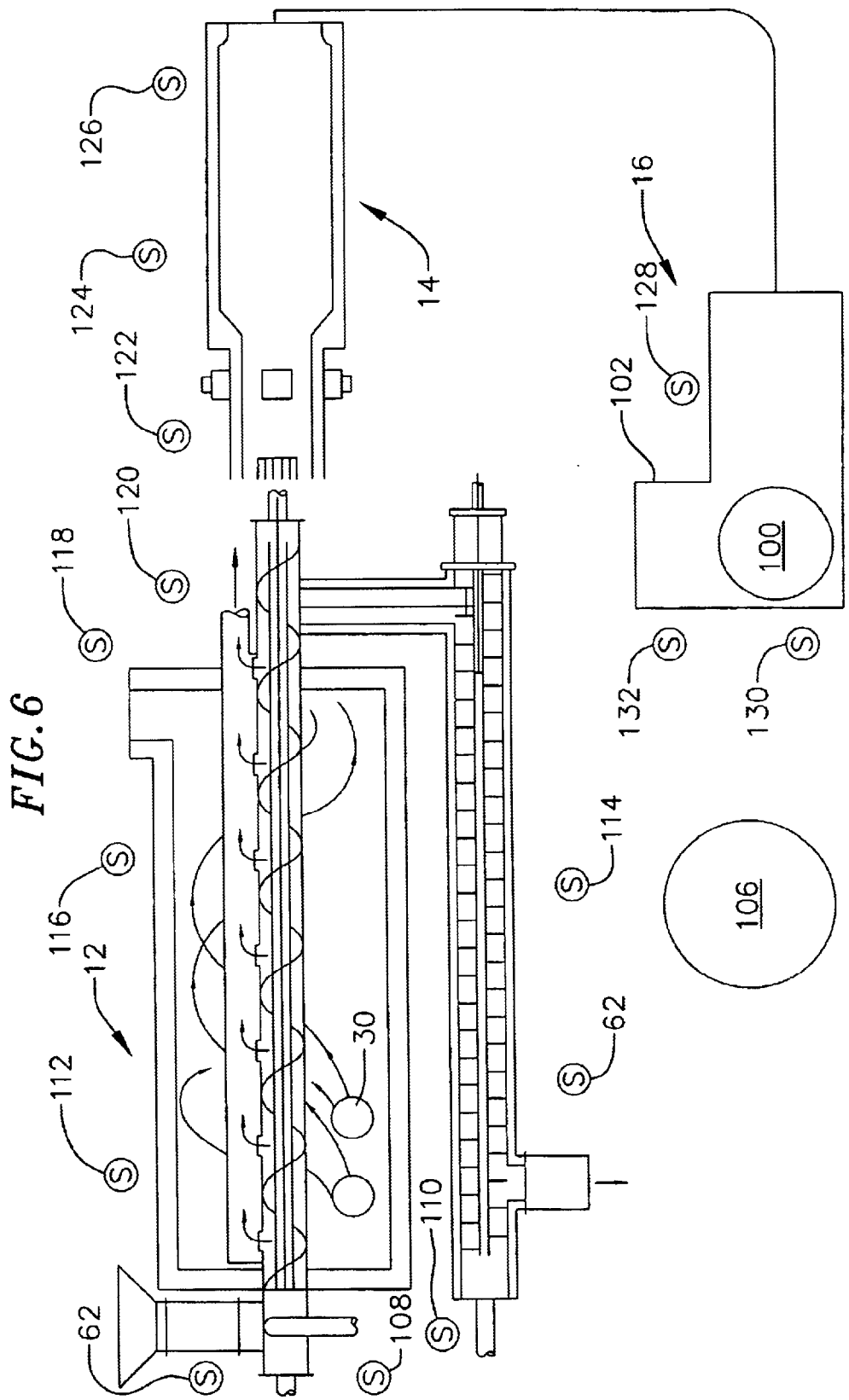

SYSTEM AND METHOD FOR THERMALLY REDUCING SOLID AND LIQUID WASTE AND FOR RECOVERING WASTE HEAT

CROSS REFERENCE TO RELATED APPLICATION

This application is a continuation-in-part application of prior filed and commonly owned application Ser. No. 60/305,919 filed Jul. 16, 2001 and titled "System and Method for Thermally Reducing Solid and Liquid Waste and for Recovering Waste Heat".

FIELD OF INVENTION

The present invention relates to devices and methods for thermally breaking down waste products such as refuse, producing recyclable commodities, recovering waste heat and converting the same to energy.

BACKGROUND

Solid waste, such as refuse, medical waste, toxic wastes, oilfield sludge, sewage sludge, chemical wastes, discarded tires, contaminated soils and the like continue to present global problems concerning disposal. For non-toxic refuse and municipal wastes, the most typical approach is to bury the same in landfills. As landfills become full, the problem of where and how to dispose of solid wastes increases. While it has been known to compact such solid refuse waste, compaction will only increase the life of a landfill and simply put off the problem until the landfill is full.

Toxic and chemical wastes suffer from the same problem. Modernly these wastes, which may be sludges, contaminated soil from an environmental clean up such as Brownfields sites, or a broad spectrum of other wastes are sent to specially designed, lined, landfills. These wastes, are typically stabilized with products such as by being mixed with dry Portland cement and then moved to the lined landfill. Again, sending such wastes to landfills does not treat the waste, reduce waste weight and volume and/or eliminate the on-going liabilities to the waste generator.

Eventually, as toxic landfills become full, more disposal sites will have to be procured at enormous financial costs to public, private and governmental groups.

Another problem particularly associated with toxic landfills is that they are usually sited in remote locations. Both environmental groups and the public at large have adopted a policy of rejecting placement of landfills in their geographic areas. Thus, wastes must be transported long distances to landfills, thereby significantly increasing the chances for accidents or toxic spill incidents during transportation and increasing the costs of disposal.

Past practices have been known to burn or incinerate refuse and toxic waste. Due to increased governmental and regulatory standards, the potential health impacts of carcinogenic air emissions, such as dioxins and furans to the public and the risks of spreading toxic plumes, the burning of wastes, for the most part has been abandoned.

It is known to recycle wastes such as paper, plastic, aluminum, glass, metal and the like: however, there remains a large volume of refuse waste which cannot be recycled.

One product which has contributed to landfills is used tires.

In Hansen et al, U.S. Pat. No. 4,759,300 titled Method and Apparatus for the Pyrolysis of Waste Products" and issued Jul. 26, 1986, the disclosure of which is hereby incorporated by reference, a method and apparatus for the pyrolysis of waste products is disclosed. According to this patent, the sludge is pumped to a pre-processing unit which drives off moisture for the sludge. The dried material is fed to a double-pass retort where the material is moved through a first pipe (defining a first retort) with a screw. The pipe is externally heated with a natural gas burner to pyrolize the waste material. The material is then passed through a second, externally heated, screw retort to an outlet. The gases from pyrolysis in the first and second retorts are collected to be used to fire the burner. The combustion gases are vented to atmosphere.

In Hansen et al U.S. Pat. No. 5,653,183 titled "Pyrolytic Waste Treatment System" issued Aug. 5, 1997, the disclosure of which is incorporated by reference, discloses a system where waste material is metered by two valves into a single, specially configured retort having a screw. The retort is heated by external burners and some of the gases produced by the pyrolysis of the waste is fed back into the front end of the retort. The retort off games are sent to a thermal oxidizer where they are combusted in a natural gas burner. The gases from the thermal oxidizer may be sent to a waste heat boiler.

A drawback to prior devices and systems is that the heated retort is relatively long to provide for pyrolysis along its length. That is, according to the prior art external heat is applied externally to the retort for complete pyrolysis along the heated length. Since conventional thinking required external heating along the substantial length of the retort the same requires (i) a long retort and (ii) a long combustion chamber to accommodate the long retort. This requirement of externally heating the retort along its length and the corresponding long combustion chamber has contributed to the expense of pyrolysis units.

Still further the requirement for pyrolysis to be accomplished along the length of the retort and because the nature of the material being moved through the retort has contributed to the axial length and size of the retort making units unsuitable for transportation or for trailer mounting. It would be advantageous to provide a unit where the pyrolysis could accomplished with a relatively short retort apparatus and where the combustion chamber is of a minimum size.

It would also be advantageous to provide a device and system which provides for substantially continuous feed rather than slug feed as hereinafter used in the systems described above.

It would also be advantageous to provide a system and device which is susceptible to modular construction so that such units can be transported or even trailer mounted for transportation, for example, to a waste clean-up site.

It would further be advantageous to provide a system and method which can be automated and programmed to process waste streams in a safe manner.

It also would be advantageous to provide a system and method where the waste heat from the pyrolysis and thermal conversion could be used to generate steam and/or power or for other commercial uses.

In this regard there is a need for a system and method which can significantly reduce the volume which need to go to landfill and which can deactivate and stabilize most, if not all, of the toxic components of numerous waste streams.

There is also a need for a system and method that uses indirect heat to reduce wastes, not by burning or incinerating, but in the absence of oxygen.

There is also a need for a system and method that can accomplish these goals, without releasing toxic gases into the environment while additionally producing steam and electricity.

BRIEF DESCRIPTION OF THE DRAWINGS

These and other features and advantages of the present invention will become better understood with reference to the description and drawings wherein:

FIG. 3 is a cross section view of the thermal oxidizer unit of the system and method;

FIG. 4 is an end view of another example of the thermal oxidizer;

FIG. 5 illustrates to rotary air lock for pyrolysis unit for feeding and removing material;

FIG. 6 is a flow diagram for the system and method; and

DESCRIPTION

Figure 1:
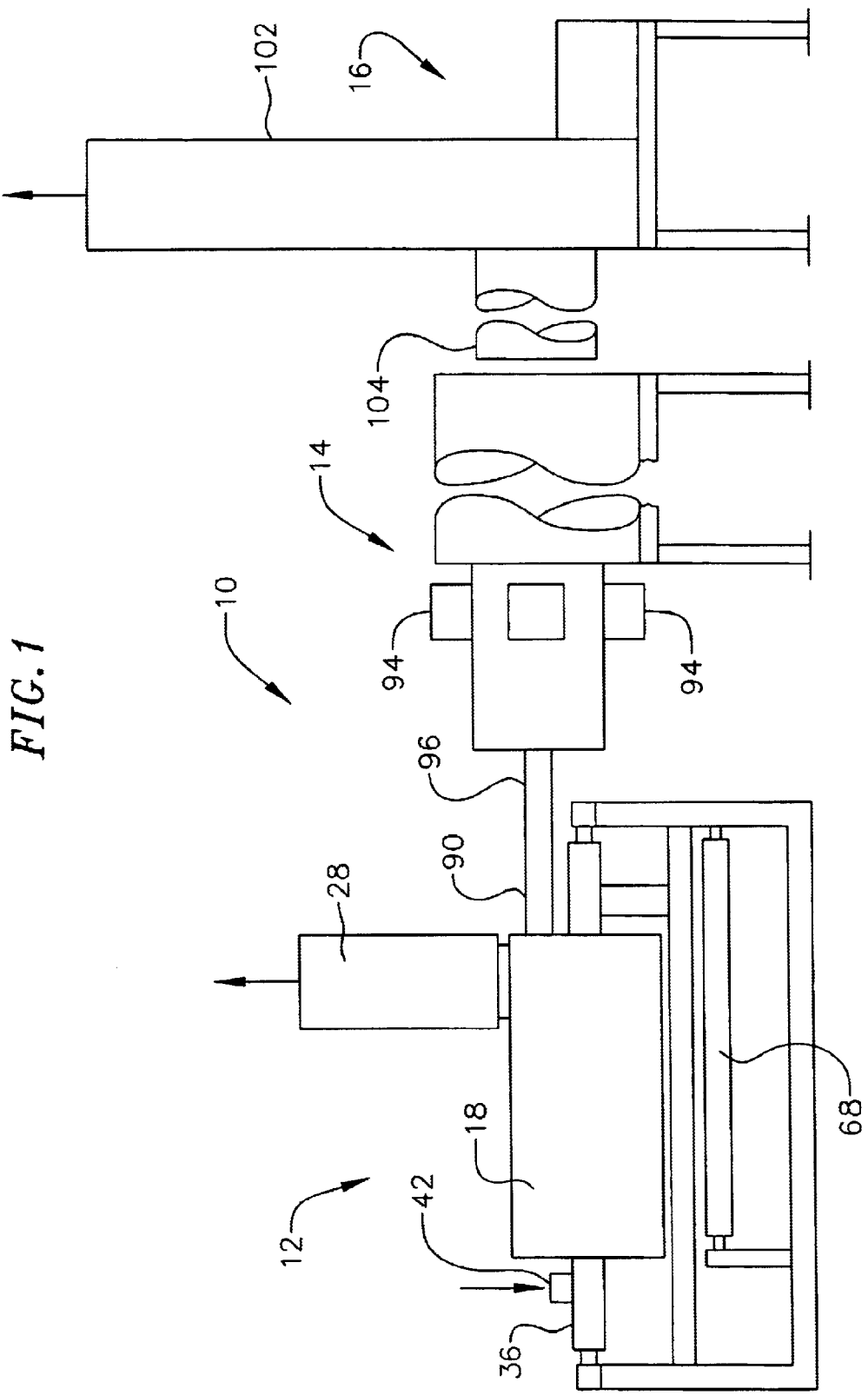
FIG. 1 illustrates an example of an overall layout of the system and method according to the present invention.

Turning to FIG. 1 there is shown the system 10 including a pyrolysis unit 12, a thermal oxidizer unit 14 and stack unit 16. Each of the component units will be described in detail below. As will become evident, the component units are suitable for skid or trailer mounting so that the components may be transported and assembled at a desired site or may be assembled on one or several trailers and transported and used at a site while on the transportation trailers or skids.

Figure 2:
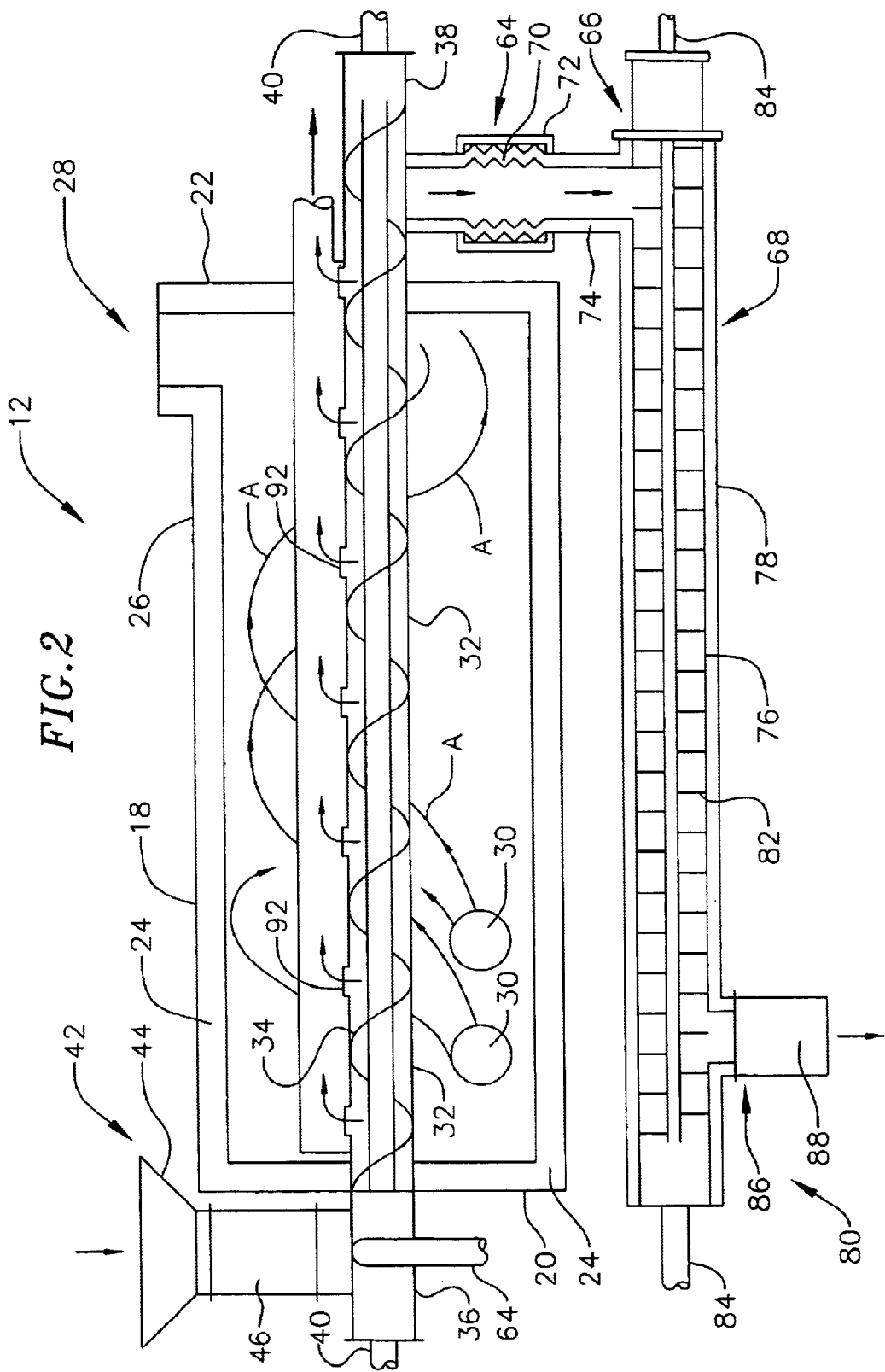
FIG. 2 illustrates the pyrolysis unit of the system and method.

The pyrolysis unit 12 is shown in FIGS. 1 and 2. The pyrolysis unit 12 has a combustion chamber 18, which may be cylindrical shape, and has generally closed first and second ends 20, 22. The combustion chamber 18 is fashioned from a suitable material to withstand temperatures in the range of 1200–2600 degrees Fahrenheit. For example, the combustion chamber 18 may be constructed from 0.25 inch carbon steel plate and lined with high temperature ceramic fiber, rated for 2600 degree Fahrenheit operation. The ceramic fiber will be held in place by type 304 stainless steel clips. With such a construction the temperature of the outer shell 26 will not commonly exceed 140 degrees Fahrenheit. The unit may be fabricated in two halves. Proximate the second end 22 the combustion chamber 18 has an exhaust 28.

Disposed on the combustion chamber 18 are one or more burners 30 which may be natural gas or propane fired and which are adapted to generate and supply hot combustion gases into the combustion chamber 18. While two burners 30 are illustrated it should be understood that more or fewer could be provided. As shown the burners 30 are disposed proximate the first end 22 and may be directed such that the combustion gases spiral through the combustion chamber 28 to the exhaust 28 as suggested by arrows A.

Disposed substantially axially through the combustion chamber 18 is a generally closed first retort segment 32 having a cylindrical cross section and having disposed therein a first segment conveying element shown as screw 34. The first retort segment 32 has a feed end 36 and a discharge end 38. As illustrated the feed end 36 and discharge end 38 extend through the first and second ends 20, 22, respectively, of the combustion chamber 18. The screw 34 is adapted to be axially rotated to move material inside the first retort segment 32 from the feed end 36 to the discharge end. To provide for controlled operation (rotation) of the screw 38, the screw 38 has a shaft 40 which extends from the ends of the first retort segment 32 and which are sealed and suitable journalled for rotation of the shaft 40. One end of the is shaft 40 is coupled to drive means such as a variable speed motor (not shown) for controlling the rotation of the screw 34.

At the feed end 36 are means for feeding material into the first retort segment 32. Where the feed stock is a solid material such as, for example, pieces of shredder rubber from disposed tired, the shredded rubber is fed into a solid inlet 42 which may have a funnel 44 to retain feed stock and direct the same into a first airlock 46. The first airlock 46 is adapted to provide a regulated feed of material into the first retort segment 32 which can be substantially continuous or discontinuous as desired. Further, since it is undesirable to admit oxygen (air) into the first retort segment 32 in that the same may result in combustion or explosion instead of pyrolysis, the first airlock 46 is adapted to prevent or minimize the admission of oxygen into the first retort segment 32.

Turning to FIG. 5, a diagram of the first airlock 46 is shown. The first airlock 46 includes a housing 48 including an inlet 50 and an outlet 52. The housing 48 supports a valve operator 54 which is cylindrical having a shaft 56 extending to the exterior of the housing 56. The operator 54 has a plurality of wedge shaped compartments 58 which are rotatably sealed by the housing 48 as they are rotated between the inlet 50 and outlet 52. To controllably rotate the shaft 56 an electric, first airlock motor 60 is provided. The motor 60 may be coupled to the shaft 56 by a belt or chain drive, gears or the like or there may be a direct drive arrangement. Operation of the motor 60 rotated the shaft 56 to move the compartments 58 to receive material from the solid inlet 42, inlet 50 and to transport the material in a sealed fashion to the outlet 52 where the material falls into the feed end 36 of the first retort segment 32. As the compartments 58 sequentially register with the inlet and outlet 50, 52 material is fed in a sealed manner into the feed end 36. Each compartment 58 is sealed by the housing 48. Thus only minimal amounts or air is admitted at the feed end 36 r the first retort segment 32. Also, and contrary to alternate operating slide or block values, substantially continuous feed rates can be obtained. Further, since the compartments 58 admit small amounts of material at a time into the feed end 36, it is believed that the feed is less susceptible to being blocked or clogged by larger amounts being feed at one time.

To sense rotation or the shaft 56 and proper operation of the first airlock, a first airlock shaft motion sensor 62 is provided. Should the airlock operator 54 jam or the motor 60 fail, the sensor will send a signal of that condition.

The solid feed stock may be transported to the solid inlet 42 by a separate conveyor (not shown) or from a pre-processing unit (not shown) where the material is shredded and sized, where materials such as metals not subject to pyrolysis are removed and the like.

To feed liquid or sludge material suitable for pumping, the pyrolysis unit 12 may include a liquid feed 64 (FIG. 2). The liquid may be mixed at the feed end 36 with solid material (e.g. shredded tires, contaminated soil) from the solid inlet 42 to reduce the rate at which moisture is admitted into the first retort segment 32 since an overabundance of moisture will reduce the efficiency of the pyrolysis unit 12 by absorbing heat. Thus solid material may be mixed at a desired rate to minimize the rate at which moisture is added. Thus solid and liquid/sludge material may be co-processed. Alternatively, drying or absorbing material such as Portland cement may be added at the solid inlet 42 strictly for stabilizing and absorbing moisture.

The liquid/sludge may be fed by a Moyno pump, air operated pump, gravity feed or other type of motive means.

The waste feed stock, liquid and/or solid, is fed into the first retort segment 32 at the feed end 36. The rotating screw 34 conveys the material from the feed end to the discharge end 38 along the length of the first retort segment 32. Along the length of the first retort segment 32 disposed in the combustion chamber 18 the first retort segment 32 and its material being conveyed by rotation of the screw 34 is subject to the heat from the burners 30 and the hot combustion gases swirling about the first retort segment 32. The direction of the burners 30 and their flow along arrows A causes the hot gases to swirl around the first retort segment to evenly supply heat to the first retort segment 32. At the discharge end 38 the material falls though a conduit 64 into the feed end 66 of a second retort segment 68 disposed outside of the combustion chamber 18. It should be noted that the material entering the second retort segment 68 may not be completely pyrolyzed and still retains the heat added while being transported through the combustion chamber 18.

To provide for thermal expansion of the conduit 64 and for relative movement between the first and second retort segments 32, 68 the conduit 64 as suggested in FIG. 2 may be fashion with corrugations 70. The corrugations 70 provide for a degree of vertical and lateral movement between the first and second retort segments 32, 68 which may occur due to thermal expansion or the like. A cannister 72 may be provided to enclose the corrugations and may include insulating material 74 to thermally insulate the conduit 64.

The second retort segment 68 is disposed outside the combustion chamber 18 and may be arranged below the first retort segment 32 so that the material may be fed by gravity through the conduit 64 into the feed end 66. The second retort segment 68 is cylindrical with an inner tube 76 and a radially spaced outer shell 78. Ceramic fiber or other thermally insulating material is disposed between the inner tube 76 and outer shell 78 to retain heat within the tube 76 as well as for safety purposes. The second retort segment 68 has the aforesaid feed end 66 as well as a discharge end 80.

Journalled for rotation within the inner tube 76 is a conveyor shown as a paddle screw 82. The screw 82 is configured to, when rotated, convey material from the feed end 66 to the discharge end 80. The screw 82 has a shaft 84 which extends from and is sealed with both ends of the second retort segment 68 for journalling and supporting the screw 82. Screw 82 drive means such as a motor (not shown) are coupled to the shaft 84 for controlled drive and rotation of the screw 82.

Proximate the discharge end 80 is a discharge 86 including a second airlock 88 of a configuration like the first airlock 46. Material conveyed to the discharge 86 by the screw 82 has been pyrolyzed and is discharges from the pyrolysis unit 12 through the second airlock 88 into a suitable container.

In operation, waste feed stock (e.g. scrap and shredded tires) is fed into solid inlet 42 where is settles in the funnel 44. Controlling the motor 60, the airlock operator 54 is rotated to transport the solid waste in compartments 58 to drop into the feed end 36 of the first retort segment 32. The screw 34 conveys the waste along its length where the material is heated and pyrolyzed in a substantially oxygen free environment. The hot combustion gases from the burners 30 swirl about the first retort segment 32 to heat the material to the desired temperature for pyrolysis, e.g. between 1200 and 1800 degrees Fahrenheit. The action of the screw 34 also mixes the material. At the end of the first retort segment 32 the material which may not be completely pyrolyzed drops to the second retort segment 68 where the screw 82 conveys the material to the discharge 86 for discharge through the second airlock 88. While being conveyed through the second retort segment 68 the material continues to pyrolyze and mix due the heat retained by the material from the first retort segment 32. No additional heat is added to the material while it is in the second retort segment 68. The insulation of the second retort segment retains heat in the system.

In a like manner, where liquid/sludge is to be pyrolyzed, it is supplied through conduit 64 and follows the same path.

Since the second retort segment 68 is not in the combustion chamber 18, it may be positioned to turn the path of the material being conveyed as suggested in the drawings by turning the flow path back on itself. Thus the combustion chamber 18 and first retort segment 32 may be relatively short and the entire package may be skid or trailer mounted. Further, the smaller package provided by the first an second retort segments 32, 68 reduces cost and provides for easier maintenance in that the second retort segment 68 may be replaced or removed from the pyrolysis unit.

To collect gases liberated during pyrolysis in the first and second retort segments 32, 68 a collection vent 90 is disposed in the combustion chamber 18 and may be arranged parallel to the first retort segment 32. The vent 90 may be embodied as a pipe mated to the first retort segment 32 and having along its length openings 92 in communication with the interior of the first retort segment 32. The vent 90 is maintained at a negative pressure (vacuum) so that gases liberated by pyrolysis pass through the openings 92. Gases liberated in the second retort segment 68 flow up the conduit 64 into the first retort segment 32 and into the vent 90.

To dispose of the gases, which may be hazardous or having a noxious odor, these gases are drawn by the negative pressure into the thermal oxidizer unit 14 as shown in FIGS. 1 and 6. When the hot gases reach the thermal oxidizer unit 14, they are combusted with oxygen and retained for 0.5 to 2.0 seconds. Toxic and noxious wastes are eliminated. At the elevated temperatures of the thermal oxidizer unit 14, 1600 degrees to 2250 degrees Fahrenheit, the resulting emissions are mostly in the form of carbon dioxide and water vapor. There may be trace amounts of nitrous oxide, sulfur dioxide, carbon monoxide and oxygen in the air emissions. Emissions other than carbon dioxide and water are rarely found in concentrations that would exceed the most stringent air emissions criteria. The thermal oxidizer unit 14 may be cylindrical and fabricated from ¼ inch carbon steel plate and lined with ceramic fiber blanket. (2600 degree Fahrenheit operating temperature).

To oxidize the gases from the pyrolysis unit 12, the thermal oxidizer as shown in FIGS. 1, 2 and 3 has natural gas or propane fired burners disposed at locations about the inlet 96. To provide combustion and mixing air to control combustion and temperature at the burners for oxidation of the games, a plurality of vents 98 are provided. These vents 98 may be about the periphery of the thermal oxidizer unit 14 (FIG. 3) or may be disposed at the inlet 96 end as shown in FIG. 4. The vents may be remotely controlled to admit more or less air into the thermal oxidizer unit 14. Opposite the inlet 96 the thermal oxidizer unit may expand in diameter to provide for the desired residual time and for mixing.

To dispose of the combusted gases from the thermal oxidizer unit 14 and to impose a negative pressure on the thermal oxidizer unit 14 and vent 90, the stack unit 16 is provided. The stack unit 16 includes a draft blower or fan 100 which is adapted to impose a negative draft on the thermal oxidizer unit 14 and pyrolysis vent collection vent 90 and to discharge the oxidized gases through a stack 102. To mix with and cool the gases drawn from the thermal oxidizer unit 14, the stack unit inlet plenum 104 may be spaced from the discharge of the thermal oxidizer unit 14 as suggested in FIG. 1. The fan may be sized to have the capacity to take 2200 Fahrenheit discharge from the thermal oxidizer unit and dilute and cool the air to 380 degrees Fahrenheit prior to discharge to atmosphere.

To control the operation of the system 10, various sensors are provided and are operatively connected to a system controller 106 as illustrated in FIG. 6. For example, the sensor 62 is coupled to the controller to sound and alarm in the event the first or second airlocks 46, 88 are not operating properly with the controller 106 terminating operation of the first airlock motor 60. Sensors 108, 110 sense rotation and speed of the shafts 40, 84 of the first and second retort segments 32, 68. Based upon empirical and experimental data concerning the heat required, time for pyrolysis and the like the controller 106 may speed up or slow down the rotation of any shaft by controlling its drive. Sensors 112 and 114 sense the temperatures within the first and second retort segments which data is processed by the controller to control the burners 30 as well as the first and second retort segment screws 34, 82 to provide the desired amount of heat to be added to the system 10 for pyrolysis of he waste material. Sensor 116 senses the combustion chamber 18 which data enables the controller 106 to determine proper operation of the burners 30. Sensor 118 senses the temperature at the exhaust 28 of the combustion chamber 18. At the collection vent 90 another sensor 120 senses temperature and pressure which data permits the controller 106 to determine whether the fan 100 is providing sufficient draft as well as for the control of the thermal oxidizer unit 14 burners 94 and vents 98.

At the thermal oxidizer unit 14 a sensor 122 senses the positions of the vents 98 and/or intake air flow rate and sensor 124 senses temperature at the zone of the burners 94 which data the controller 106 compares to predetermined parameters or sensed parameters to control the burners 94 and vents 98 to assure oxidation of the gases. Sensor 126 senses temperature and/or flow and/or pressure which data the controller 106 incorporates into its assessment of the proper operation of the unit 14. For example, whether there is the proper amount of draft. The sensor 126 may also detect certain chemical compositions for determination of proper oxidation.

At the stack unit 16 sensor 128 senses temperature and pressure for the controller to, for example, confirm proper draft and inlet temperature. If the draft is insufficient the fan 100 is controlled to increase the draft. A sensor 130 senses the fan speed to provide feedback to the controller 106. Sensor 132 at the stack sensor 132 senses temperature as well a certain chemical compositions to determine the nature and temperature of the gases discharged to the environment.

The controller 106 accepts the data from the various sensors to monitor operations, as well as to determine if any problems in the system have arisen, e.g. blocked inlet or discharge, screw motor failure or the like. Other sensors and monitors may be provided such as oxygen sensors and/or pressure sensors for the first and second retort segments to sense an undesirable combustion or explosive situation wherein the controller 106 may activate a nitrogen flooding system to flood the retort segments, thermal oxidizer and/or combustion chamber.

Under the control of the controller 106 the system 10 may operate on an automated bases based upon a pre-programmed sequence and based upon the empirically or experimentally determined parameters for the feed material.

Figure 7:
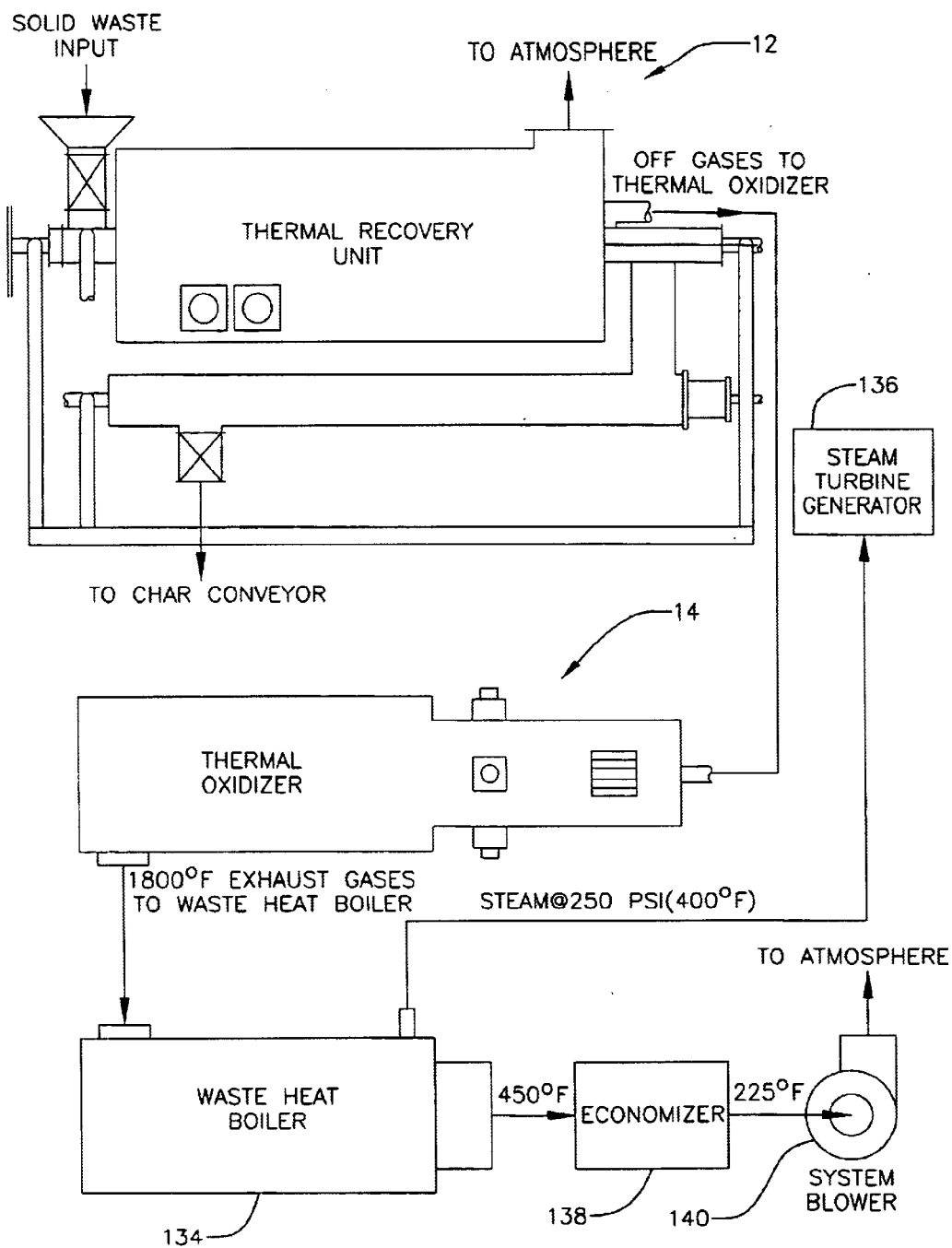
FIG. 7 illustrates incorporating the system and method into a system for using the waste heat for generating electricity.

Turning to FIG. 7, there is shown the system 10 incorporating means for recovering energy from waste heat. As shown, the discharge from the thermal oxidizer unit 14 is supplied to a water heat boiler 134 where water is heated to produce, for example steam at 400 degrees Fahrenheit and a pressure of 250 pounds (psig). The steam is supplied to a turbine generator 136 for generation of electricity to be used for the system or to be supplied to the electrical grid. The heated discharge from the boiler 134 may be directed to an economizer 138 to pre-heat the circulating water from a condenser (not shown) downstream from the turbine 136 before entering the boiler 134. A blower 140 directs the heated gases to the atmosphere.

If desired the heated gases discharged from the combustion chamber 18 may also be directed to the boiler 134 or economizer if desired.

The steam from the boiler 134 could be used for other purposes such as for plant steam, heating, or for other purposes.

Further, depending upon the constituency of the gases leaving the thermal oxidizer unit 14, a gas (wet or dry) scrubber (not shown) could be interposed before the stack unit 16 or incorporated therein.

Reductions up to 95% from the initial waste material volume can be achieved by the system 10; therefore, only 5% of the waste stream would be discharged as solid material.

The system 10 and method of the present invention are adapted to destroy most forms of solid waste, liquid waste, hazardous waste, industrial wastes, and all forms of volatile organic compounds (VOC's). The system 10 and method can be used to process hydrocarbons, PCB's, rubber, chlorides, herbicides, pesticides, plastics, wood and paper. As can be appreciated, the system 10 and method is not an incinerator. Rather than burning wastes, this process disintegrates wastes into more basic elemental forms.

Regarding the mixing of liquid and solid wastes, one practical example of the system 10 is the blending of low BTU wastes with high BTU wastes to enhance co-generation capabilities. Additionally, low BTU solid waste such as municipal solid waste may be simultaneously processed with high BTU sludge's or liquids to further enhance possible co-generation applications under a "waste-to-energy" scenario.

The pyrolysis process breaks down the waste material into gas and carbon ash. The ash may be recycled as carbon black or for other uses.

Further, additives may be added to the waste feed stock for purposes of stabilizing the material, making the waste more susceptible to pyrolysis or to fix or combine with products in the waste.

The system and method of the present invention is capable of processing a multitude of problem waste streams. These waste streams include but are not limited to auto fluff from wrecking yards, mining and tailing wastes, oil field sludge's, sewage sludge, medical wastes, DDT type pesticides, Agent Orange type herbicides and non-recyclable plastics. Processing scenarios include combining problem waste feedstock's that have varying physical characteristics, varying throughput characteristics and varying commodity recovery rates.

While we have shown certain embodiments of the present invention, it is subject to many modifications without departing from the spirit and scope of the claims set forth herein.

We claim:

1. A pyrolysis system for pyrolyzing a waste feed stock comprising:

a closed combustion chamber having an exhaust:

a first retort segment disposed in the combustion chamber, said first retort segment including an inlet, an outlet and a first screw disposed through the first retort;

a first screw drive to drive the first screw to rotate to move material from said inlet to the outlet;

a feeder to feed waste feed stock into the first retort;

a burner to supply heated combustion gases into the combustion chamber to pyrolyze the waste feed stock moving through said first retort segment, said combustion gases discharged at said exhaust;

a second retort segment disposed outside of said combustion chamber and including an inlet, an outlet, and a conveyor to move pyrolyzing material from the inlet to the outlet for discharge thereof;

a second retort segment feed conduit to feed the pyrolzing material from the first retort outlet to the second retort inlet; and a thermal oxidizer in communication with the first and second retort segments to receive and combust gases liberated by pyrolysis; and said first and second retort segments disposed in a spaced relationship and an expansion joint at the second retort segment feed conduit to adjust for relative movement between the first and second retort segments.

2. A pyrolysis system for pyrolyzing a waste feed stock comprising:

a closed combustion chamber having an exhaust:

a first retort segment disposed in the combustion chamber, said first retort segment including an inlet, an outlet and a first screw disposed through the first retort;

a first screw drive to drive the first screw to rotate to move material from said inlet to the outlet;

a feeder to feed waste feed stock into the first retort;

a burner to supply heated combustion gases into the combustion chamber to pyrolyze the waste feed stock moving through said first retort segment, said combustion gases discharged at said exhaust;

a second retort segment disposed outside of said combustion chamber and including an inlet, an outlet, and a conveyor to move pyrolyzing material from the inlet to the outlet for discharge thereof;

a second retort segment feed conduit to feed the pyrolzing material from the first retort outlet to the second retort inlet; and a thermal oxidizer in communication with the first and second retort segments to receive and combust gases liberated by pyrolysis; and a first airlock at said first retort segment inlet and a second airlock as the second retort segment outlet to prevent air from entering the first or second retort segments, said first airlock is a rotary valve having a rotating member with at least one cavity to receive solid waste feed material in a first position and in a second position deposit the contents of the cavity into the first retort segment inlet, a valve operator to the valve member between the first and second position and a controller to control the operator to control the rate of feed of the waste material into the first retort segment.

3. The system of claim 2 comprising a valve member sensor to at least sense movement of the valve member.

4. The system of claim 2 comprising said second airlock is a rotary valve having a rotating member with at least one cavity to receive solid waste feed material in a first position and in a second position discharge the contents of the cavity from the second retort, a valve operator to the valve member between the first and second position and a controller to control the operator to control the rate of discharge of the pyrolyzed waste material from the second retort segment.

5. The system of claim 4 comprising a valve member sensor to at least sense movement of the valve member.

* * * * *